(12) United States Patent
Hida et al.

(10) Patent No.: US 10,898,988 B2
(45) Date of Patent: Jan. 26, 2021

(54) MASKING TAPE FOR SHOT PEENING PROCESS

(71) Applicant: NITTO DENKO CORPORATION, Ibaraki (JP)

(72) Inventors: Takafumi Hida, Ibaraki (JP); Kazuhiro Kitayama, Ibaraki (JP); Shu Sasaki, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

(21) Appl. No.: 16/073,368

(22) PCT Filed: Jan. 10, 2017

(86) PCT No.: PCT/JP2017/000409
§ 371 (c)(1),
(2) Date: Jul. 27, 2018

(87) PCT Pub. No.: WO2017/130678
PCT Pub. Date: Aug. 3, 2017

(65) Prior Publication Data
US 2019/0039208 A1    Feb. 7, 2019

(30) Foreign Application Priority Data
Jan. 29, 2016  (JP) .................................. 2016-015759

(51) Int. Cl.
*B24C 1/04*    (2006.01)
*B24C 1/10*    (2006.01)
(Continued)

(52) U.S. Cl.
CPC .................. *B24C 1/04* (2013.01); *B24C 1/10* (2013.01); *B32B 7/02* (2013.01); *B32B 27/00* (2013.01);
(Continued)

(58) Field of Classification Search
None
See application file for complete search history.

(56) References Cited

U.S. PATENT DOCUMENTS 4,433,105 A * 2/1984 Matsuda .................. C08F 8/22
525/211
6,338,574 B1    1/2002 Shimizu et al.
(Continued)

FOREIGN PATENT DOCUMENTS

JP    07-133468 A    5/1995
JP    08-073823 A    3/1996
(Continued)

OTHER PUBLICATIONS

International Search report of PCT/JP2017/00409 filed Feb. 28, 2017.
Notice of Reasons for Refusal dated Oct. 3, 2019 from the Japanese Patent Office in application No. 2016-015759.
Extended European Search Report dated Aug. 8, 2019, from the European Patent Office in counterpart European Application No. 17743909.8.

*Primary Examiner* — Frank D Ducheneaux
(74) *Attorney, Agent, or Firm* — Sughrue Mion, PLLC

(57) ABSTRACT

Provided is a masking tape for a shot peening process, including: a substrate having a first surface and a second surface; and a pressure-sensitive adhesive layer disposed on the first surface of the substrate. The masking tape has a breaking strength of 55 N/15 mm or more and exhibits an impact absorption rate of 20% or more in a falling ball impact test. Further, the masking tape has a displacement distance of 2 mm or less after 1 h from an initial position in a holding power test at 40° C. which is performed by applying a load of 500 g.

4 Claims, 1 Drawing Sheet

(51) Int. Cl.
  *B32B 27/00* (2006.01)
  *B32B 27/30* (2006.01)
  *B32B 7/02* (2019.01)
  *C09J 7/20* (2018.01)
  *C09J 161/14* (2006.01)
  *C09J 121/00* (2006.01)
  *C09J 7/24* (2018.01)
  *C09J 5/00* (2006.01)
  *C08K 5/098* (2006.01)
  *C08K 5/10* (2006.01)
  *C09J 7/38* (2018.01)

(52) U.S. Cl.
  CPC .......... *B32B 27/30* (2013.01); *B32B 27/304* (2013.01); *C08K 5/098* (2013.01); *C08K 5/10* (2013.01); *C09J 5/00* (2013.01); *C09J 7/20* (2018.01); *C09J 7/245* (2018.01); *C09J 7/38* (2018.01); *C09J 121/00* (2013.01); *C09J 161/14* (2013.01); *B32B 2405/00* (2013.01); *C09J 2301/408* (2020.08); *C09J 2301/41* (2020.08); *C09J 2301/50* (2020.08); *C09J 2421/00* (2013.01); *C09J 2427/00* (2013.01); *C09J 2461/00* (2013.01)

(56) References Cited

U.S. PATENT DOCUMENTS

| 6,524,700 | B2 * | 2/2003 | Masuda | H01L 21/6836 428/343 |
| 7,851,531 | B2 * | 12/2010 | Yatagai | C09J 107/02 524/270 |
| 2006/0035075 | A1 | 2/2006 | Mussig et al. | |
| 2007/0117496 | A1 | 5/2007 | Maron | |
| 2009/0017241 | A1 | 1/2009 | Sakuma et al. | |
| 2009/0252958 | A1 * | 10/2009 | Nishijima | C09J 7/245 428/355 BL |

FOREIGN PATENT DOCUMENTS

| JP | 2000-227119 A | 8/2000 |
| JP | 2000-303833 A | 10/2000 |
| JP | 2004-255797 A | 9/2004 |
| JP | 2010-234552 A | 10/2010 |
| JP | 2013-049862 A | 3/2013 |
| JP | 5720690 B2 | 5/2015 |
| JP | 2015-196792 A | 11/2015 |
| WO | 2012/017658 A1 | 2/2012 |

* cited by examiner

MASKING TAPE FOR SHOT PEENING PROCESS

TECHNICAL FIELD

The present invention relates to a masking tape for a shot peening process.

This application is a National Stage of International Application No. PCT/JP2017/000409 filed Jan. 10, 2017, claiming priority based on Japanese Patent Application No. 2016-015759 filed on Jan. 29, 2016, the entire contents of which are incorporated herein by reference.

BACKGROUND ART

Shot peening treatment in which particles (shot material) are caused to collide at high speed with the surface of an article to be treated has been performed as a type of cold working. At this time, it is known to affix a masking tape to a non-treatment-target portion (that is, a portion which is not the target of the shot peening treatment) of the article to be treated in order to protect the non-treatment-target portion. Patent Literature 1 is a technical document relating to shot peening. Patent Literature 2 relates a shot blasting process for scraping a coated surface or a metal surface.

CITATION LIST

Patent Literature

Patent Literature 1: Japanese Patent No. 5720690
Patent Literature 2: Japanese Patent Application Publication No. 2015-196792

SUMMARY OF INVENTION

Technical Problem

Unlike the shot blasting treatment performed for surface removal as in Patent Literature 2, the shot peening treatment is not intended to remove the surface of the article to be treated. Therefore, in the shot peening treatment, it is desirable that the amount of foreign matter mixed with the shot material after use be small. This is because there is a concern that disadvantages such as nozzle clogging may occur when recovering and reusing the shot material mixed with foreign matter. Regarding this point, since the tape substrate in the masking tape for shot blasting disclosed in Patent Literature 2 is hard and lacks shock absorbing property, collision of the tape substrate with particles generates scraps, for example, the tape substrate is partially broken by the blasting treatment, such a result making the masking tape unsuitable for the shot peening process.

Therefore, it is an object of the present invention to provide a masking tape for a shot peening process (hereinafter may be simply referred to as "masking tape").

Solution to Problem

According to this specification, there is provided a masking tape for a shot peening process including: a substrate having a first surface and a second surface; and a pressure-sensitive adhesive (PSA) layer disposed on the first surface of the substrate. In a preferred embodiment, the masking tape has a breaking strength of 55 N/15 mm or more, exhibits an impact absorption rate of 200% or more in a falling ball impact test, and has a displacement distance of 2 mm or less after 1 h from an initial position in a holding power test at 40° C. which is performed by applying a load of 500 g. Such a masking tape can exhibit satisfactory durability against shot peening treatment. Further, with such a masking tape, the mask area of the article to be treated (that is, the non-treatment-target portion) can be suitably protected from the effect of the shot peening treatment. In addition, since the masking tape is less likely to generate scraps from the substrate even when exposed to the shot peening treatment, contamination of the working environment can be suppressed. Furthermore, in the masking tape, when the masking tape is peeled off from the treated article after the shot peening treatment, residue of the PSA or the like hardly remains on the surface of the treated article. Thus, the masking tape advantageously tends to have excellent ability of not leaving an adhesive residue on the treated article.

In a masking tape according to a preferred embodiment, the substrate has a thickness which is 4.0 times or more the thickness of the PSA layer. A masking tape having such a configuration is preferable because it is easy to achieve durability against shot peening treatment, protective property with respect to the mask area, and ability of not leaving an adhesive residue on the treated article at a high level at the same time.

It is preferable that the substrate have a thickness of 120 μm or more. A masking tape having such a configuration tends to have excellent durability against shot peening treatment and protective property with respect to the mask area.

It is preferable that the PSA layer have a thickness of less than 50 μm. A masking tape having such a configuration tends to have excellent ability of not leaving an adhesive residue on the treated article.

In a preferred embodiment, a substrate including a polyvinyl chloride film can be used as the substrate. The polyvinyl chloride film typically includes a plasticizer. A masking tape having such a configuration is preferable since the tape tends to show moderate elongation deformability that can contribute to improving the affixing property and the like.

As the polyvinyl chloride film, one including an elastomer can be advantageously used. The inclusion of an elastomer in the polyvinyl chloride film can be useful for improving, for example, the flexibility of the masking tape.

In a preferred embodiment, the polyvinyl chloride film may include 15 parts by weight or more of a plasticizer based on 100 parts by weight of polyvinyl chloride. A masking tape having such a configuration is preferable because the tape shows moderate elongation deformability that can contribute to improving the affixing property.

In another preferred embodiment, the polyvinyl chloride film includes a carboxylic acid ester-based plasticizer and a polyester-based plasticizer. A masking tape having such a configuration is preferable because the tape has satisfactory ability of not leaving an adhesive residue on the treated article and shows moderate elongation deformability that can contribute to improving the affixing property.

The PSA layer may be composed of a rubber-based PSA. According to the art disclosed herein, in the configuration having such a rubber-based PSA layer, it is possible to provide a masking tape which exhibits durability against shot peening treatment, protective property with respect to the mask area, and satisfactory ability of not leaving an adhesive residue on the treated article at the same time.

In a preferred embodiment, the rubber-based PSA includes a reactive phenolic resin. A masking tape provided with a PSA layer composed of such a rubber-based PSA is preferable because the tape tends to exhibit excellent ability of not leaving an adhesive residue.

According to another aspect of the present invention, there is provided a method for manufacturing an article, the method including a shot peening step of subjecting an article to be treated, in which any of the masking tapes disclosed herein is affixed to a masking-target portion, to shot peening treatment. According to the manufacturing method, by using a masking tape exhibiting satisfactory durability, protective property and ability of not leaving an adhesive residue, it is possible to efficiently produce an article adequately subjected to shot peening treatment.

DESCRIPTION OF EMBODIMENTS

Preferred embodiments of the present invention are described below. Matters necessary to practice this invention other than those specifically referred to in this description can be understood by a person skilled in the art based on the disclosure about implementing the invention in this description and common technical knowledge at the time the application was filed. The present invention can be practiced based on the contents disclosed in this description and common technical knowledge in the subject field.

The masking tape disclosed herein includes a substrate having a first surface and a second surface, and a PSA layer provided on the first surface of the substrate. The concept of "masking tape" in this specification may include what is referred to as "masking sheet". Typically, the masking tape disclosed herein is configured as a PSA sheet having a shape in which the longitudinal dimension is larger than the dimension in the width direction, and preferably configured as a band-shaped PSA sheet in which the longitudinal dimension is larger than the dimension in the width direction.

Figure 1:
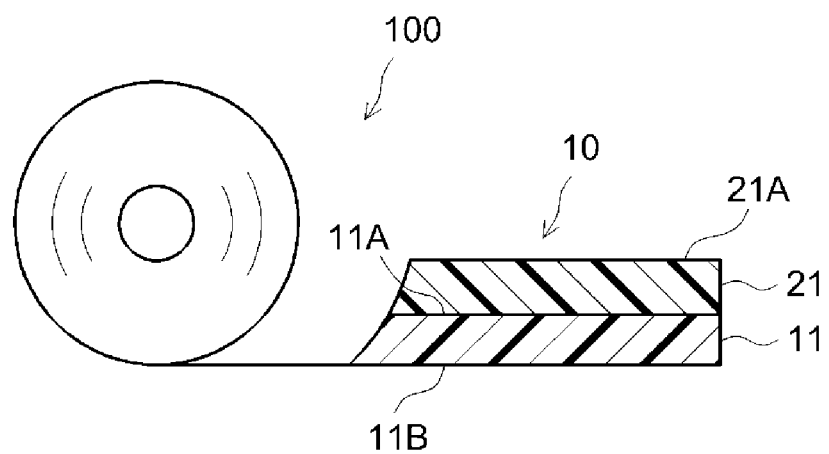
FIG. 1 shows a cross-sectional diagram schematically illustrating the configuration of the masking tape according to one embodiment.

A typical configuration example of a masking tape according to one embodiment is schematically shown in FIG. 1. A masking tape 10 includes a sheet-shaped substrate (for example, a resin film) 11 having a first surface 11A and a second surface 11B, and a PSA layer 21 provided on the first surface 11A thereof. The masking tape 10 is used by affixing to a non-treatment-target portion of the article to be treated. By performing the shot peening treatment in a state where the masking tape 10 is affixed to the non-treatment-target portion, it is possible to prevent the non-treatment-target portion from being affected by the shot peening process (for example, deformed, damaged, modified, and the like, due to collision with the shot material).

For example, as shown in FIG. 1, the masking tape 10 before being used (that is, before being affixed to the article to be treated) can be wound in the longitudinal direction to form a masking tape roll 100 in which the PSA layer 21 is in contact with the second surface 11B whereby the surface (PSA surface) 21A thereof is protected. The masking tape in the form of such a masking tape roll 100 can be affixed, for example, by affixing one end of the masking tape 10 to an adherend, applying a tension between the affixed portion and the roll 100, unwinding the roll 100 (that is, feeding out the masking tape 10 from the roll 100), and cutting the masking tape 10 between the affixed masking tape and the remaining masking tape roll 100.

Figure 2:
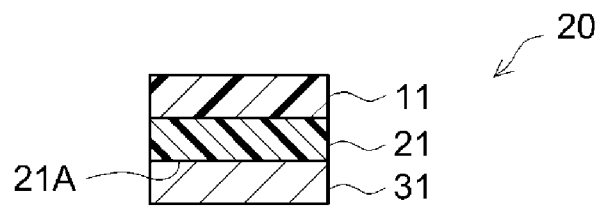
FIG. 2 shows a cross-sectional diagram schematically illustrating the configuration of the masking tape according to another embodiment.

Alternatively, the masking tape before use may be in the form where the surface 21A of the PSA layer 21 is protected by a release liner 31 having a release surface at least on the side facing the PSA layer 21, for example, as in the masking tape 20 shown in FIG. 2. As the release liner, a known or commonly-used release liner can be used without particular limitations. For instance, can be used a release liner having a release layer on a surface of a substrate such as plastic film and paper, a release liner formed from a low adhesive material such as fluoropolymers (polytetrafluoroethylene, and the like) and polyolefin-based resins (polyethylene, polypropylene, and the like), and the like.

(Breaking Strength)

It is preferable that the masking tape disclosed herein have a breaking strength of about 55 N/15 mm or more. The masking tape having such a breaking strength can exhibit satisfactory durability against shot peening treatment. For example, satisfactory durability against cracking, tearing, rupturing, and the like of the substrate by shot peening treatment can be obtained. The breaking strength of the masking tape may be about 60 N/15 mm or more, about 70 N/15 mm or more, and further about 75 N/15 mm or more (for example about 80 N/15 mm or more). As the breaking strength increases, the durability against shot peening treatment tends to improve. The upper limit of the breaking strength of the masking tape is not particularly limited. The breaking strength can be, for example, about 500 N/15 mm or less, about 300 N/15 mm or less, and about 250 N/15 mm or less. As a result of suppressing the breaking strength, adaptability to elongation deformation also tends to be easily achievable. In one embodiment, the breaking strength of the masking tape may be about 200 N/15 mm or less, or even about 150 N/15 mm or less. The art disclosed herein can be preferably implemented, for example, in a mode in which the breaking strength of the masking tape is about 55 N/15 mm or more and about 250 N/15 mm or less (more preferably about 70 N/15 mm or more and about 150 N/15 mm or less). The breaking strength can be adjusted, for example, by selection of the substrate and the thickness of the substrate.

The breaking strength of the masking tape is measured according to JIS K 7127:1999. More specifically, the breaking strength (can be also referred to hereinbelow as "room-temperature breaking strength") can be measured by using a test piece having a width of 15 mm and performing a tensile test under conditions of 23° C., 50% RH and a tensile rate of 300 mm/min. "AUTOGRAPH AG-IS" (product name), manufactured by Shimadzu Corporation can be used as the tensile tester. The length of the test piece is about 150 mm, and the test piece is set in the tensile tester so that the distance between the chucks is 100 mm. The test piece is stretched under the above conditions until it breaks, and the maximum tensile load (N/15 mm) at that time is taken as the room-temperature breaking strength of the test piece. The same measurement method is also used in the examples described hereinbelow. Although the tensile direction in the tensile test is not particularly limited, when the masking tape is long, it is preferable that the tensile direction coincide with the longitudinal direction of the masking tape.

It is preferable, but not particularly limiting, that the low-temperature breaking strength of the masking tape disclosed herein be about 70 N/15 mm or more. A masking tape having such a low-temperature breaking strength can exhibit satisfactory durability even against shot peening treatment performed in a low temperature environment (for example, shot peening treatment performed in a factory in winter). For example, satisfactory durability against cracking, tearing, rupturing, and the like of the substrate by shot peening treatment can be obtained. The low-temperature breaking strength of the masking tape may be about 85 N/15 mm or more, about 100 N/15 mm or more, and further about 110 N/15 mm or more (for example about 120 N/15 mm or more). As the low-temperature breaking strength increases, the durability against shot peening treatment tends to improve. The upper limit of the low-temperature breaking strength of the masking tape is not particularly limited, and the low-temperature breaking strength can be set, for example, to about 600 N/15 mm or less, and may be about 400 N/15 mm or less, or about 300 N/15 mm or less. As a result of suppressing the breaking strength, adaptability to elongation deformation also tends to be easily achievable even when the masking tape is affixed at a low temperature. In one embodiment, the low-temperature breaking strength of the masking tape may be about 250 N/15 mm or less, or even about 200 N/15 mm or less. The art disclosed herein can be preferably implemented, for example, in a mode in which the low-temperature breaking strength of the masking tape is about 70 N/15 mm or more and about 300 N/15 mm or less (more preferably, about 100 N/15 mm or more and about 200 N/15 mm or less). The low-temperature breaking strength can be adjusted, for example, by selection of the substrate and the thickness of the substrate.

The low-temperature breaking strength of the masking tape is measured in the same manner as the room-temperature breaking strength except that the measurement environment is set to 0° C. The same measuring method is also used in the examples described hereinbelow.

(Elongation at Break)

The masking tape disclosed herein preferably has a certain degree of adaptability to elongation deformation. For example, it is preferable that the masking tape have an elongation at break of about 150% or more. Such a masking tape is easy to use because fine adjustment such as alignment of the outer edge of the masking tape with the outline of the mask area may be easily performed by stretching and deforming the masking tape at the time of affixing to the adherend (article to be treated). Further, as a result to being adaptable to elongation deformation, the masking tape can be easily affixed without wrinkling or floating even when the surface shape of the adherend is nonplanar (for example, a convex surface, a concave surface, a saddle-like curved surface which are gently curved at least locally, or the like).

Usually, an appropriate elongation at break of the above masking tape is about 200% or more, preferably about 230% or more, and more preferably about 250% or more (for example, about 260% or more), but these ranges are not limiting. The upper limit of the elongation at break is not particularly limited, but from the viewpoint of workability and the like at the time of peeling the masking tape after shot peening treatment, the appropriate elongation at break is usually about 500% or less, preferably about 450% or less, and more preferably about 400% or less (for example, about 350% or less). The art disclosed herein can be preferably implemented, for example, in a mode in which the masking tape has an elongation at break of about 200% or more and about 450% or less (for example, about 230% or more and about 400% or less). The elongation at break can be adjusted, for example, by selection of the substrate and the structure of the substrate.

The elongation at break of the masking tape can be determined as the elongation at the time the test piece is broken in the room-temperature braking strength measurement. The same measuring method is also used in the examples described hereinbelow.

(Impact Absorption Rate)

The masking tape disclosed herein preferably exhibits an impact absorption rate of about 20% or more in a falling ball impact test. With the masking tape having such an impact absorption rate, impacts caused by collision with the shot material can be efficiently absorbed by the masking tape. As a result, the mask area (that is, the non-treatment-target portion) of the article to be treated can be suitably protected from the effect of the shot peening treatment (for example, deformation of the non-treatment-target portion, occurrence of dents and scratches, modification, and the like). The impact absorption rate may be about 25% or more, about 30% or more, about 35% or more, and about 40% or more. As the impact absorption rate increases, the performance of protecting the mask area tends to improve. The impact absorption rate is preferably as high as possible, for example, the impact absorption rate may be almost 100%. Meanwhile, from the viewpoints of ease of production, cost efficiency, and the like, it is usually appropriate to set the impact absorption rate to about 85% or less (preferably about 75% or less, for example about 65% or less). The art disclosed herein can be preferably implemented, for example, in a mode in which the impact absorption rate is about 20% or more and about 85% or less (for example, about 35% or more and about 65% or less). The impact absorption rate can be adjusted, for example, by selection of the substrate and the thickness of the substrate.

The impact absorption rate of the masking tape can be measured by a falling ball impact test. Specifically, the impact absorption rate is calculated by the following formula:

$$\text{Impact absorption rate } (\%) = (F0 - F1)/F0 \times 100$$

from a maximum impact force F0 when a 23.7-g steel ball is allowed to fall freely from a height of 80 cm on a measuring stand maintained horizontally and a maximum impact force F1 when the steel ball is dropped from above in the same manner after the PSA surface of the masking tape has been affixed to the measuring stand. The same measuring method is also used in the examples described hereinbelow.

(Holding Power)

In a 40° C. holding power test of the masking tape disclosed herein which is conducted under application of a load of 500 g, it is preferable that the displacement distance after 1 h from the initial position be 2 mm or less. A masking tape exhibiting such a behavior is preferable since it tends to have excellent ability of not leaving an adhesive residue on the treated article. It is preferable that the displacement distance be as small as possible, preferably 1.5 mm or less, and more preferably 1 mm or less (for example, 0.5 mm or less). In one embodiment, the displacement distance may be 0.3 mm or less, 0.2 mm or less, or 0.1 mm or less.

The holding power test is carried out according to the method for measuring "holding power" specified in JIS Z 0237:2009. Specifically, by affixing a single-sided PSA tape having a PSA layer on one side of a polyester film having a thickness of 25 μm to the back side of the masking tape to be evaluated, backing (reinforcing) of the masking tape is implemented. A test piece is then obtained by cutting to a size of 10 mm in width and 50 mm in length. An area of 20 mm in length (that is, an area of 10 mm in width and 20 mm in length) from one end of the test piece is press-bonded at a room temperature (typically, 23° C.) to a bakelite plate (phenolic resin plate) as an adherend with a 2-kg roller rolling back and forth once. The test piece which has thus been affixed to the adherend is allowed to stand for 30 min under the same environment, and the adherend is thereafter hung down so that the longitudinal direction of the test piece is in the vertical direction. A load of 500 g is applied to the free end of the test piece. After allowing the test piece to stand for 1 h under the environment of 40° C. in the state where the load is applied, the distance (displacement distance) by which the test piece has displaced from the initial affixing position is measured. A tape with a product name "31B" manufactured by Nitto Denko Corporation can be used as the single-sided PSA tape for backing. The same measuring method is also used in the examples described hereinbelow.

<Substrate>

In the masking tape disclosed herein, the material and configuration of the substrate are not particularly limited, and for example, a resin film, a foam sheet, a metal foil, nonwoven fabric, woven fabric, composites thereof, or the like can be used. The first surface (the surface on which the PSA layer is provided) of the substrate may be subjected to the conventional well-known surface treatment such as application of an undercoat agent, corona discharge treatment, plasma treatment, and the like. Such a surface treatment can be performed to improve the adhesion between the substrate and the PSA layer, in other words, to improve the anchoring property of the PSA layer to the substrate. The composition of a primer is not particularly limited, and it can be appropriately selected from known ones. The thickness of the undercoat layer is not particularly limited, but is preferably about 0.01 µm or more and about 1 µm or less, and more preferably about 0.1 µm or more and about 1 µm or less.

A material having a structure including a resin film can be preferably used as the substrate of the masking tape disclosed herein. For example, a polyvinyl chloride (PVC) resin, a polyurethane resin, an ethylene-vinyl acetate resin (EVA), a polyolefin resin, a polyester resin, a polyamide resin, a polyimide resin, a polyamideimide resin, a polyether ether ketone resin, a polyether sulfone resin, a polyphenylene sulfide resin, a polycarbonate resin, a fluororesin such as polytetrafluoroethylene, an acrylic resin, or the like can be used as the resin material constituting the resin film. From the viewpoint of flexibility and moldability, a resin material including a thermoplastic resin can be preferably used.

The resin film may be formed by using a resin material including one kind of such resin alone or may be formed by using a resin material in which two or more kinds are blended. The resin film may be non-stretched and may be stretched (for example, uniaxially stretched or biaxially stretched). The resin film may have a single layer structure or a multilayer structure of two or more layers (for example, a three-layer structure). In the resin film having a multilayer structure, the resin materials constituting each layer may be the same as each other or different from each other.

The resin film may include, if necessary, known additives which can be used for a resin film (in particular, a resin film for a PSA tape substrate) to the extent that the effect of the present invention is not significantly impaired. Examples of such additives include coloring agents such as pigments and dyes, stabilizers, stabilizing aids, light stabilizers, ultraviolet absorbers, modifiers, flame retardants, antistatic agents, antifungal agents, lubricants, and the like. The amount of these additives used can be a general amount in the field of resin films.

From the viewpoints of affixing property and impact absorption property, it is preferable that a material configured to include a PVC film be used as the substrate of the masking tape disclosed herein. The PVC film is typically obtained by forming a PVC composition (PVC resin) including a predetermined component into a film by a known method. Here, the PVC composition refers to a composition in which the main component (a component which is contained in largest amount; may be a component contained in excess of 50% by weight) is PVC. With such a PVC composition, a PVC film (typically a film made of a soft PVC resin) suitable as a substrate for supporting the PSA layer of the masking tape for shot peening treatment can be formed. Typically, the amount of PVC in the PVC film is greater than about 40% by weight, and it is usually appropriate to set this amount to about 50% by weight or more. The art disclosed herein can be preferably implemented in a mode in which the amount of PVC in the PVC film is greater than 50% by weight (typically about 55% by weight or more, such as about 60% by weight or more).

(PVC)

The PVC constituting the PVC composition may be exemplified by various polymers having vinyl chloride as the main monomer (which is the main component of the monomer components and may be a monomer taking greater than 50% by weight of the monomer component). That is, the concept of PVC referred to herein is inclusive of not only a homopolymer of vinyl chloride but also of copolymers of vinyl chloride and various comonomers. Examples of the comonomers include vinylidene chloride; olefins such as ethylene and propylene (preferably olefins having 2 to 4 carbon atoms); carboxyl group-containing monomer such as acrylic acid, methacrylic acid (hereinafter, acrylic and methacrylic are generically referred to as "(meth) acrylic"), maleic acid, fumaric acid, and the like, and anhydrides thereof (maleic anhydride and the like); esters such as (meth)acrylic acid esters, for example esters of (meth) acrylic acid and an alkyl alcohol or a cycloalkyl alcohol having about 1 to 10 carbon atoms; vinyl ester monomers such as vinyl acetate, vinyl propionate, and the like; styrene monomers such as styrene, substituted styrene (α-methyl styrene and the like), vinyl toluene and the like; and acrylonitrile, and the like. As for the copolymers, those having a copolymerization ratio of vinyl chloride of about 70% by weight or more (more preferably about 90% by weight or more) are preferable. PVC is obtained by polymerizing such monomers by an appropriate method (typically a suspension polymerization method).

The average degree of polymerization of the PVC contained in the PVC composition may be, for example, about 600 or more and about 1800 or less, but this range is not limiting. In consideration of balance between processability (moldability) and strength, it is usually preferable to use PVC having an average degree of polymerization of about 800 or more and about 1600 or less (for example, about 900 or more and about 1500 or less).

(Plasticizer)

The PVC film typically includes a plasticizer. By using a plasticizer in the PVC film, it is possible to improve the impact absorption rate and elongation at break of the PVC film (and consequently of the substrate including the PVC film, and further of the masking tape provided with the substrate).

Various materials known to exhibit the effect of plasticizing PVC can be used without particular limitation as the plasticizer. Examples of the plasticizer include, but are not limited to, carboxylic acid ester-based plasticizers, polyesters (polyester-based plasticizers) of polyvalent carboxylic acids and polyhydric alcohols, polyether-based polyesters, epoxy-based polyesters (epoxidized vegetable oils such as epoxidized soybean oil and epoxidized linseed oils, epoxidized fatty acid alkyl esters, and the like), phosphoric acid esters (tricresyl phosphate, and the like), and the like. The plasticizers may be used singly or in suitable combination of two or more thereof.

Examples of the carboxylic acid ester-based plasticizers include aromatic carboxylic acid esters such as benzoic acid esters (benzoic acid glycol esters and the like), phthalic acid esters, terephthalic acid esters, trimellitic acid esters, pyromellitic acid esters, and the like; aliphatic carboxylic acid esters such as adipic acid esters, sebacic acid esters, azelaic acid esters, maleic acid esters, and citric acid esters (tributyl acetyl citrate and the like); and the like.

Suitable examples of the phthalic acid esters (phthalic acid ester-based plasticizers) include diesters of phthalic acid and an alkyl alcohol having 4 to 16 (preferably 6 to 14, typically 8 to 13) carbon atoms, and the preferred examples include di-n-octyl phthalate, di-2-ethylhexyl phthalate, diisononyl phthalate, diisodecyl phthalate, and the like. Among them, diisononyl phthalate is preferable.

Suitable examples of the terephthalic acid esters (terephthalic acid ester-based plasticizer) include diesters of terephthalic acid and an alkyl alcohol having 4 to 16 (preferably 6 to 14, typically 8 to 13) carbon atoms, a preferred example is bis(2-ethylhexyl) terephthalate.

Suitable examples of the trimellitic acid esters (trimellitic acid ester-based plasticizers) include triesters of trimellitic acid and an alkyl alcohol having 6 to 14 (typically 8 to 12) carbon atoms, and the preferred examples include tri-n-octyl trimellitate, tri-2-ethylhexyl trimellitate, triisononyl trimellitate, tri-n-decyl trimellitate, triisodecyl trimellitate, and the like.

Suitable examples of the pyromellitic acid esters (pyromellitic acid ester-based plasticizers) include tetraesters of pyromellitic acid and an alkyl alcohol having 6 to 14 (typically 8 to 12) carbon atoms, and the preferred examples include tetra-n-octyl pyromellitate, tetra-2-ethylhexyl pyromellitate, tetra-n-decyl pyromellitate, and the like.

Suitable examples of the adipic acid esters (adipic acid ester-based plasticizers) include diesters of adipic acid and an alkyl alcohol having 4 to 16 (preferably 6 to 14, typically 8 to 13) carbon atoms, and the preferred examples include di-n-octyl adipate, di-2-ethylhexyl adipate, diisononyl adipate, and the like.

Aromatic carboxylic acid esters can be preferably used as the carboxylic acid ester-based plasticizers. Among them, ester compounds derived from tri- or more functional (typically, tri- or tetrafunctional) aromatic carboxylic acids are preferable. Specific examples of such aromatic carboxylic acid esters include trimellitic acid esters and pyromellitic acid esters. The number of carbon atoms of the ester residue in the aromatic carboxylic acid ester is preferably 6 or more, more preferably 8 or more. Due to the increase in the number of carbon atoms, the ability of the plasticizer to migrate into the PSA layer tends to decrease. The upper limit of the number of carbon atoms of the ester residue is not particularly limited, but from the viewpoints of handling property, compatibility with PVC, and the like, an appropriate number is usually 16 or less, preferably 14 or less, and more preferably 12 or less (for example, 10 or less).

Polyester compounds obtained from polyvalent carboxylic acids and polyhydric alcohols can be used as the polyesters (polyester-based plasticizers).

Examples of the polyvalent carboxylic acids include succinic acid, adipic acid, suberic acid, azelaic acid, sebacic acid, citric acid, phthalic acid, isophthalic acid, terephthalic acid, trimellitic acid, and the like. Aliphatic dicarboxylic acids having 4 to 12 (typically 6 to 10) carbon atoms are preferable as the polyvalent carboxylic acids, and preferable examples thereof include adipic acid and sebacic acid. In particular, adipic acid is desirable in terms of availability and price.

Examples of polyhydric alcohols include (poly)ethylene glycol (here, "(poly)ethylene glycol" means to be inclusive of ethylene glycol and polyethylene glycol, the same applies hereinbelow), (poly)propylene glycol, (poly)butylene glycol, (poly)hexane diol, (poly)neopentyl glycol, polyvinyl alcohol, and the like. Aliphatic diols having 2 to 10 carbon atoms are preferable as the polyhydric alcohols, and preferred examples thereof include ethylene glycol, butylene glycol (for example, 1,3-butanediol, 1,4-butanediol), and the like.

Among polyester-based plasticizers, adipic acid polyester-based plasticizers obtained from dicarboxylic acids based on adipic acid and aliphatic diols such as neopentyl glycol, propylene glycol, ethylene glycol, and the like are preferable.

Examples of commercially available polyester plasticizer products include "W-230H", "W-1020EL", "W-1410EL", "W-2050", "W-2300", "W-2310", "W-2360", "W-360ELS", "W-4010", and the like manufactured by DIC Corporation; "P-300", "PN-250", "PN-400", "PN-650", "PN-1030", "PN-1430", and the like manufactured by ADEKA Corporation; and "HA-5" and the like manufactured by Kao Corporation.

The amount of the plasticizer in the PVC film is not particularly limited. The amount of the plasticizer (or the total amount thereof when two or more plasticizers are included) can be, for example, about 15 parts by weight or more, preferably about 20 parts by weight or more, and more preferably about 30 parts by weight or more (for example, about 40 parts by weight or more) with respect to 100 parts by weight of PVC. As the amount of the plasticizer increases, the impact absorption rate and the elongation at break of the masking tape tend to improve. From the viewpoint of easily obtaining a masking tape having the above-mentioned preferable breaking strength, it is usually appropriate to set the amount of the plasticizer to about 150 parts by weight or less, preferably about 120 parts by weight or less, and more preferably about 100 parts by weight or less (for example, about 80 parts by weight or less) with respect to 100 parts by weight of PVC. Reducing the amount of the plasticizer with respect to 100 parts by weight of PVC may be advantageous also from the viewpoint of suppressing the decrease in the holding power due to the migration of the plasticizer in the substrate to the PSA layer.

In a PVC film including a carboxylic acid ester-based plasticizer, the amount of the carboxylic acid ester-based plasticizer with respect to 100 parts by weight of PVC is advantageously about 50 parts by weight or less, preferably about 40 parts by weight or less, and more preferably about 35 parts by weight or less, but these ranges are not limiting. The art disclosed herein can be preferably implemented, for example, in a mode in which the amount of the carboxylic acid ester-based plasticizer is about 30 parts by weight or less (for example, about 25 parts by weight or less) with respect to 100 parts by weight of PVC. The lower limit of the amount of the carboxylic acid ester-based plasticizer can be set so as to obtain desired flexibility, but it is usually appropriate to set the amount to about 5 parts by weight or more (preferably about 10 parts by weight or more, for example, about 15 parts by weight or more) with respect to 100 parts by weight of PVC.

In a PVC film including a polyester-based plasticizer, the amount of the polyester-based plasticizer with respect to 100 parts by weight of PVC is preferably about 60 parts by weight or less, and more preferably about 50 parts by weight or less (for example, about 40 parts by weight or less), but these ranges are not limiting. The lower limit of the amount of the polyester-based plasticizer can be set so as to obtain desired flexibility, but it is usually appropriate to set the amount to about 5 parts by weight or more (preferably about 10 parts by weight or more, for example, about 15 parts by weight or more) with respect to 100 parts by weight of PVC.

In a preferred embodiment of the art disclosed herein, the PVC film includes, as a plasticizer, a combination of a carboxylic acid ester-based plasticizer and a polyester-based plasticizer. According to such an embodiment, it is possible to suitably improve the impact absorption rate and the elongation at break of the masking tape, and to effectively suppress the decrease in the breaking strength and the decrease in the holding power.

In the embodiment including a combination of a carboxylic acid ester-based plasticizer and a polyester-based plasticizer, the ratio of the amount of the polyester-based plasticizer to the amount of the carboxylic acid ester-based plasticizer is not particularly limited. The ratio ($W_B/W_A$) of the weight ($W_B$) of the polyester-based plasticizer to the weight ($W_A$) of the carboxylic acid ester-based plasticizer contained in the PVC film can be, for example, 0.1 or more and 10 or less, and this ratio may also be 0.2 or more and 5 or less, 0.3 or more and 3 or less, and 0.5 or more and 2 or less.

(Elastomer)

In a preferred embodiment of the art disclosed herein, the PVC film can include an elastomer. By including an elastomer, it is possible to improve the flexibility (in particular, flexibility at low temperature) of the PVC film. As a result, for example, durability against shot peening treatment in a low temperature environment can be improved. The inclusion of an elastomer in PVC film can also help to improve room-temperature breaking strength and low-temperature breaking strength. The elastomer can also contribute to an improvement in the elongation at break of the PVC film.

Various known polymer materials can be used as the elastomer. Non-limiting examples of such elastomers include chlorinated polyethylene (CPE), an ethylene-vinyl acetate copolymer, a vinyl chloride-vinyl acetate copolymer (for example, a vinyl chloride-vinyl acetate copolymer having vinyl acetate amount of about 10% by weight or more, typically about 10% by weight to 25% by weight), a (meth)acrylic acid ester-butadiene-styrene copolymer (for example, a methyl methacrylate-butadiene-styrene copolymer), an acrylonitrile-butadiene-styrene copolymer, an acrylonitrile-butadiene copolymer, a styrene-butadiene copolymer (typically, a styrene-butadiene block copolymer, for example, a styrene-butadiene block copolymer having a styrene amount of about 35% by weight or less, typically about 10% by weight to 35% by weight), a styrene-butadiene-styrene block copolymer, chlorosulfonated polyethylene (CSM), a polyester-based thermoplastic elastomer, a thermoplastic polyurethane, other synthetic rubbers (isoprene rubber, butadiene rubber, and the like), composites and modified products thereof. As the chlorinated polyethylene, polyethylene having a chlorine amount of about 25% by weight or more and 50% by weight or less (more preferably about 30% by weight or more and 45% by weight or less, for example, about 35% by weight or more and 45% by weight or less) is preferably used. The elastomers can be used singly or in combination of two or more thereof.

When the PVC film includes an elastomer, the amount of the elastomer in the PVC film is not particularly limited and can be set so as to obtain a desired effect. From the viewpoint of suitably exerting the effect of the elastomer, it is usually appropriate to set the amount of the elastomer to about 1 part by weight or more, preferably 5 parts by weight or more, more preferably 10 parts by weight or more, and even more preferably 15 parts by weight or more (for example, 17 parts by weight or more) with respect to 100 parts by weight of PVC. From the viewpoint of compatibility with PVC and the like, it is usually appropriate to set the amount of the elastomer to about 60 parts by weight or less, preferably about 50 parts by weight or less, and more preferably about 40 parts by weight or less (for example, about 35 parts by weight or less) with respect to 100 parts by weight of PVC.

When the PVC film includes a combination of a plasticizer and an elastomer, the ratio of the amount of the elastomer to the amount of the plasticizer is, for example, 0.1 or more and 2.0 or less on a weight basis, and usually it is preferable to set this ratio to 0.2 or more and 1.0 or less, and more preferably to 0.3 or more and 0.8 or less, but these ranges are not particularly limiting.

(Fatty Acid Metal Salt)

The PVC film in the art disclosed herein preferably includes a fatty acid metal salt. Compounds capable of functioning as a stabilizer of the PVC film can be used singly or in combination of two or more thereof as the fatty acid metal salt. For example, the fatty acid constituting the fatty acid metal salt can be suitably selected from saturated or unsaturated fatty acids (can be hydroxy fatty acid) having about 10 to 20 (typically about 12 to 18) carbon atoms, such as lauric acid, ricinoleic acid, stearic acid, and the like. From the viewpoint of moldability and processability of the PVC film, metal stearates can be preferably used. From the viewpoint of suppression of aging of PVC film or PVC PSA tape, flexibility at low temperature, and the like, metal laurates can be preferably used. A combination of a metal stearate and a metal laurate may be used. In this case, the ratio of the amount of the metal laurate to the amount of the metal stearate is not particularly limited and can be set, for example, to about 0.1 or more and about 10 or less on a weight basis, and it is usually appropriate to set this ratio to about 0.2 or more and 5 or less (for example, about 0.5 or more and about 2 or less).

Metals other than lead (non-lead metals) are preferably used as the metal constituting the fatty acid metal salt in consideration of the recent awareness of environmental hygiene. According to the art disclosed herein, a PVC PSA tape exhibiting satisfactory thermal degradation resistance can also be realized even in a mode in which a stabilizer including lead is not used. As the metal, for example, a metal element belonging to any one of Group 1, Group 2, Group 12, Group 13, and Group 14 (excluding Pb) of the periodic table can be selected, and preferred examples include Li, Na, Ca, Mg, Zn, Ba and Sn. From the viewpoint of cost efficiency, availability and the like, a Ca salt or a Ba salt can be preferably used as the fatty acid metal salt. From the viewpoints of moldability and processability of the PVC film, a Zn salt can be preferably used. In a preferred embodiment, a Ca salt and a Zn salt can be used in combination. In this case, the ratio of the amount of the Zn salt to the amount of the Ca salt is not particularly limited and can be set, for example, to about 0.1 to 10 on a weight basis, and it is usually appropriate to set this ratio to about 0.2 to 5 (for example, about 0.5 to 2). The art disclosed herein can be preferably implemented, for example, in a mode in which Ca stearate and Zn laurate are included at the abovementioned weight ratio or in a mode in which Zn stearate and Ca laurate are included at the abovementioned weight ratio. In applications where the use of fatty acid Pb salts is permitted, it is also possible to include a fatty acid Pb salt in the PVC film.

The amount of the fatty acid metal salt is not particularly limited. The amount of the fatty acid metal salt (when two or more kinds are used, the total amount thereof) can be, for example, such that the amount of the fatty acid metal salt in the PVC film is about 0.01% by weight or more. From the viewpoint of obtaining a higher effect, the amount is preferably about 0.02% by weight or more, and more preferably about 0.05% by weight or more. The upper limit of the amount of the fatty acid metal salt is not particularly limited, and it is usually appropriate to set the upper limit to about 5% by weight or less of the PVC film. From the viewpoint of flexibility at low temperature and the like, this amount is preferably about 3% by weight or less and more preferably about 1% by weight or less (typically about 0.5% by weight or less, for example, about 0.3% by weight or less).

(Antioxidant)

The PVC film in the art disclosed herein may include an antioxidant. As the antioxidant, a known material capable of exhibiting an antioxidant function can be used without particular limitation. Examples of the antioxidant include a phenol-based antioxidant, a phosphorus-based antioxidant, a sulfur-based antioxidant, an amine-based antioxidant, and the like. The antioxidants may be used singly or in combination of two or more thereof.

Preferable examples of the antioxidant include phenol-based antioxidants such as hindered phenol-based antioxidants. Examples of the hindered phenol-based antioxidants include pentaerythritol tetrakis[3-(3,5-di-tert-butyl-4-hydroxyphenyl) propionate] (trade name "Irganox 1010", manufactured by BASF SE), octadecyl-3-(3,5-di-tert-butyl-4-hydroxyphenyl) propionate (trade name "Irganox 1076", manufactured by BASF SE), 4,6-bis(dodecylthiomethyl)-o-cresol (trade name "Irganox 1726", manufactured by BASF SE), triethylene glycol bis[3-(3-tert-butyl-5-methyl-4-hydroxyphenyl) propionate] (trade name "Irganox 245", manufactured by BASF SE), bis(2,2,6,6-tetramethyl-4-piperidyl) sebacate (trade name "Tinuvin 770", manufactured by BASF SE), a polycondensate of dimethyl succinate and 4-hydroxy-2,2,6,6-tetramethyl-1-piperidine ethanol (dimethyl succinate-1-(2-hydroxyethyl)-4-hydroxy-2,2,6,6-tetramethylpiperidine polycondensate) (trade name "Tinuvin 622", manufactured by BASF SE), and the like. Among them, pentaerythritol tetrakis[3-(3,5-di-tert-butyl-4-hydroxyphenyl) propionate] (trade name "Irganox 1010", manufactured by BASF SE) and triethylene glycol bis[3-(3-tert-butyl-5-methyl-4-hydroxyphenyl) propionate] (trade name "Irganox 245", manufactured by BASF SE) are preferable.

The amount of the antioxidant is not particularly limited and can be, for example, such that the amount of the antioxidant in the PVC film is about 0.001% by weight or more. From the viewpoint of obtaining a higher effect, it is usually appropriate to set the amount of the antioxidant in the PVC film to about 0.005% by weight or more, preferably about 0.01% by weight or more, and more preferably about 0.05% by weight or more. In a preferred embodiment, the amount of the antioxidant in the PVC film can be about 0.1% by weight or more, about 0.5% by weight or more, and about 1% by weight or more (for example, about 1.5% by weight or more). The upper limit of the amount of the antioxidant is not particularly limited, and it is usually appropriate to set this amount to about 5% by weight or less (typically about 3% by weight or less) of the PVC film.

The PVC film may further include, if necessary, known additives which can be used for a PVC film (in particular, a PVC film for a PVC PSA tape), as long as the effect of the present invention is not significantly impaired. Examples of such additives include coloring agents such as pigments and dyes, stabilizers other than fatty acid metal salts (for example, organic tin compounds such as dioctyltin laurate), stabilizing aids (for example, inorganic compounds such as phosphites, e.g. trialkyl phosphite and the like, hydrotalcite, and zeolites), light stabilizers, ultraviolet absorbers, modifiers, flame retardants, antistatic agents, antifungal agents, lubricants, and the like. These additives can be used in amounts common in the field of PVC films.

A resin film (for example, a PVC film) is typically obtained by molding a resin material (for example, a PVC composition) having a corresponding composition into a film shape by a method known in the field of resin films. As such known molding method, for example, a melt extrusion molding method (an inflation method, a T-die method, and the like), a melt casting method, a calender method, or the like can be used.

The resin film may constitute a substrate composed of only a single-layer or multilayer resin film (preferably a thermoplastic resin film) or may constitute a substrate including other layers in addition to the resin film. In a preferred embodiment, the other layer may be an auxiliary layer such as a printing layer, a release treatment layer, a primer layer, or the like provided on the surface of the resin film. The masking tape disclosed herein can be preferably implemented in a mode in which a PSA layer is disposed on the first surface of a substrate composed of, for example, a single-layer resin film (for example, a single-layer PVC film). In another preferred embodiment, a masking tape is composed of a substrate composed of a single-layer resin film (for example, a single-layer PVC film), a primer layer disposed on the first surface of the substrate, and a PSA layer disposed on the first surface of the substrate with the prime layer being interposed therebetween.

On the second surface of the substrate, treatment such as corona discharge treatment, plasma treatment, ultraviolet irradiation treatment, acid treatment, alkali treatment, and the like is carried out for the purpose of improving printability, reducing light reflectivity, improving the overlapping property, and the like. The second surface of the substrate may be also subjected, if necessary, to conventionally known surface treatment such as release treatment or antistatic treatment. For example, by providing a release agent layer such as a long-chain alkyl-based release agent layer or a silicone-based release agent layer on the second surface of the substrate, it is possible to reduce the rewinding force of the masking tape wound in a roll shape. The masking tape disclosed herein can also be preferably implemented in a form in which the second surface of the substrate is not subjected to the above-mentioned release treatment.

As the substrate of the masking tape disclosed herein, a substrate including the resin film as described above and not including a sheet-like fiber aggregate such as nonwoven fabric, woven fabric or the like can be preferably used. With such a substrate, a masking tape having a suitable elongation deformability is easily realized. A substrate including a resin film such as described hereinabove in which the ratio of the weight of fibers and particles to the weight of the entire substrate is 20% by weight or less (preferably 15% by weight or less, more preferably 10% by weight or less, and even more preferably 5% by weight or less) can be preferably used as the substrate in the masking tape disclosed herein. Fibers and particles contained in the substrate can fall off from the substrate when the masking tape having the substrate is subjected to shot peening treatment. The matter that has fallen out (scraps of the substrate) becomes a foreign matter mixed into the shot material after use, which can hinder the collection and recycling of the shot material. In masking tapes used for shot peening treatment which is not aimed at removing the surface of the article to be treated, it is expected that the amount of foreign matter mixed with the shot material after use be small. Therefore, it is particularly meaningful to hold down the amount of fibers and particles in the substrate.

The thickness of the substrate constituting the masking tape disclosed herein is not particularly limited. The substrate can have a thickness of, for example, about 80 μm or more, and it is usually appropriate to set the thickness to about 100 μm or more (for example, about 110 μm or more). In the masking tape according to one embodiment, the thickness of the substrate may preferably be about 120 μm or more, more preferably about 150 μm or more, and even more preferably about 175 μm or more (for example, about 190 μm or more). As the thickness of the substrate increases, the breaking strength tends to increase. In addition, increasing the thickness of the substrate may also be advantageous from the viewpoint of improving the impact absorption property. Therefore, due to an increase in the thickness of the substrate, the durability against shot peening treatment and the protective property of the article to be treated tend to be improved. The masking tape disclosed herein can be preferably implemented in a form in which the substrate has a thickness of about 200 μm or more (for example, about 210 μm or more). The upper limit of the thickness of the substrate is not particularly limited, but from the viewpoints of handleability and ability to follow the surface shape of the adherend, it is usually appropriate to set the thickness to 1 mm or less. In the masking tape according to one embodiment, the thickness of the substrate may be preferably about 500 μm or less, more preferably about 450 μm or less, even more preferably about 400 μm or less. The thickness of the substrate may be about 350 μm or less and also may be about 300 μm or less (for example, about 250 μm or less). The masking tape disclosed herein can be preferably implemented, for example, in a mode in which the thickness of the substrate is about 150 μm or more and about 400 μm or less (more preferably about 170 μm or more and about 300 μm or less).

<PSA Layer>

The PSA layer in the art disclosed herein is not particularly limited and may be a PSA layer formed from a PSA composition of various forms, such as a solvent-based PSA composition, an aqueous dispersion-based PSA composition, a water-soluble PSA composition, a hot-melt type PSA composition, an active energy ray curable PSA composition, and the like. The active energy ray, as referred to herein, means energy rays having energy capable of inducing a chemical reaction such as a polymerization reaction, a crosslinking reaction, decomposition of an initiator and the like, and is inclusive of light such as ultraviolet light, visible light, and infrared light, and radiation rays such as α rays, β rays, γ rays, electron beam, neutron beam, and X-rays. Further, the solvent-based PSA composition, as referred to herein, means a PSA composition in a form including a PSA in an organic solvent. From the viewpoint of adhesive properties and the like, the art disclosed herein can be particularly preferably carried out in a mode including a PSA layer formed from a solvent-type PSA composition. The organic solvent is, for example, any one solvent or two or more solvents selected from aromatic compounds (for example, aromatic hydrocarbons) such as toluene, xylene, and the like; acetic acid esters such as ethyl acetate, butyl acetate, and the like; aliphatic or alicyclic hydrocarbons such as hexane, cyclohexane, methyl cyclohexane, and the like; and ketones such as methyl ethyl ketone, acetone, and the like.

The type of the PSA constituting the PSA layer is not particularly limited. The PSA can include, as a base polymer (a main component among the polymer components), one or two or more rubbery polymers such as rubber-based polymers, acrylic polymers, polyester polymers, urethane polymers, polyether polymers, silicone polymers, polyamide polymers, fluoropolymers, and the like which are well known in the field of PSAs. The rubber-based PSA, as referred to herein, means a PSA including a rubber-based polymer as a base polymer. This also applies to acrylic PSAs and other PSAs. Further, the "acrylic polymer", as referred to herein, means a polymer including a monomer unit derived from an acrylic monomer in the polymer structure thereof, typically, a polymer including a monomer unit derived from an acrylic monomer in a proportion exceeding 50% by weight. Here, the "acrylic monomer", as referred to herein, means a monomer having at least one (meth)acryloyl group in a molecule. The "(meth)acryloyl group", as referred to herein, means to be inclusive of an acryloyl group and a methacryloyl group.

A PSA layer (rubber-based PSA layer) including a rubber-based PSA as a main component can be preferably used as the PSA layer of the masking tape disclosed herein. In general, acrylic PSAs tend to leave adhesive residue on metal materials, which are main adherends of masking tapes for shot peening process, because such PSAs have higher polarity than rubber-based PSAs. The rubber-based PSA tends to have both a suitable adhesiveness with respect to metal materials and a satisfactory cohesive force and is unlikely to leave an adhesive residue. The rubber-based PSA may include one or two or more rubber-based polymers selected from natural rubbers and synthetic rubbers. In the present specification, the "main component", as referred to herein, means, unless otherwise specified, a component which is contained in largest amount, typically a component contained in excess of 50% by weight.

(Rubber-Based Polymer)

As the rubber-based polymer, either natural rubber or synthetic rubber can be used. As the natural rubber, known materials that can be used in PSA compositions can be used without particular limitations. The concept of natural rubber, as referred to herein, is not limited to unmodified natural rubbers and is inclusive of modified natural rubbers that have been modified with, for example, an acrylic acid ester and the like. Unmodified and modified natural rubbers may be used together. As the synthetic rubber, known materials that can be used in PSA compositions can be used without particular limitations. Preferable examples include styrene-butadiene rubber (SBR), styrene-isoprene rubber and chloroprene rubber. These synthetic rubbers may be unmodified or modified (for example, carboxy-modified). The rubber-based polymers may be used singly or in combination of two or more thereof.

The natural rubber is not particularly limited. For example, standard malaysian rubber (SMR), standard vietnamese rubber (SVR), ribbed smoked sheet (RSS), pale crepe, and the like can be used.

The Mooney viscosity of the natural rubber contained in the rubber-based PSA is not particularly limited. For example, the Mooney viscosity (Mooney viscosity $MS_{1+4}$ (100° C.)) under measurement conditions of MS (1+4) 100° C. may be about 10 or more (typically 30 or more, preferably 50 or more, more preferably 65 or more). Typically, the Mooney viscosity $MS_{1+4}$ (100° C.) of natural rubber is 150 or less, usually 120 or less (for example, 100 or less). In one embodiment, the Mooney viscosity $MS_{1+4}$ (100° C.) is about 10 to 100 (for example, about 30 to 95). In another embodiment, a natural rubber having a Mooney viscosity $MS_{1+4}$ (100° C.) of about 50 to 90 (for example, about 65 to 85) can be used. For example, a natural rubber having a Mooney viscosity $MS_{1+4}$ (100° C.) of more than 70 (typically more than 70 and 90 or less, for example, about 72 to 85) can be used. The Mooney viscosity can be adjusted by a general method of mastication and the like.

Specific examples of the synthetic rubber include polyisoprene, polybutadiene, polyisobutylene, butyl rubber, styrene-butadiene rubber (SBR), a styrene-based block copolymer (for example, a styrene-based block copolymer having a styrene amount of about 5% by weight or more and about 50% by weight or less, and preferably about 10% by weight or more and about 30% by weight or less), and the like. Specific examples of the styrene-based block copolymer include a styrene-isoprene block copolymer, a styrene-butadiene block copolymer, hydrogenated products thereof, and the like. Other examples of synthetic rubber include ethylene-propylene rubber, propylene-butene rubber, and ethylene-propylene-butene rubber. Still another example of the synthetic rubber is graft-modified natural rubber obtained by grafting another monomer (for example, an acrylic monomer, styrene, and the like) to natural rubber. These synthetic rubbers can be used singly or in combination of two or more thereof.

A PSA including a natural rubber and a synthetic rubber is a preferable example of a rubber-based polymer. The ratio of the amount of the natural rubber and the amount of the synthetic rubber is not particularly limited. The proportion of the synthetic rubber in the total amount of the natural rubber and the synthetic rubber is, for example, more than 5% by weight and 50% by weight or less (preferably, 10% by weight or more and 40% by weight or less, and more preferably 15% by weight or more and 30% by weight or less). As the synthetic rubber to be used in combination with the natural rubber, a synthetic rubber having a composition in which a styrene component is copolymerized, such as a styrene-based block copolymer or SBR, can be preferably used. From the viewpoint of not leaving an adhesive residue and the like, a combination of natural rubber and a styrene-isoprene block copolymer is particularly preferable. Also, a styrene-isoprene block copolymer including a polymer having a radial structure as a main component is preferable. Examples of commercially available styrene-isoprene block copolymers that can be preferably used include, for example, trade name "Quintac 3460C" (manufactured by Zeon Corporation).

A PSA in which a rubber-based polymer included in the PSA is substantially composed of natural rubber, that is, a PSA in which about 95% by weight or more (typically, about 98% by weight or more, for example, about 99% by weight or more, and may be 100% by weight) is composed of natural rubber, is another preferable example of a rubber-based PSA.

A PSA in which a rubber-based polymer included in the PSA is substantially composed of synthetic rubber, that is, a PSA in which about 95% by weight or more (typically, about 98% by weight or more, for example, about 99% by weight or more, and may be 100% by weight) is composed of synthetic rubber, is yet another preferable example of a rubber-based PSA.

(Tackifier Resin)

The PSA layer (typically, a rubber-based PSA layer) in the art disclosed herein may include a tackifier resin in addition to the base polymer as described above. As the tackifier resin, an appropriate one can be selected and used among various known tackifier resins. For example, one or two or more selected from various tackifier resins such as rosin-based resins, petroleum resins, terpene-based resins, phenolic resins, coumarone-indene-based resins, and ketone resins can be used.

Examples of rosin-based resins include rosin derivatives such as disproportionated rosins, hydrogenated rosins, polymerized rosins, maleinated rosins, fumarated rosins, and the like, and also phenol-modified rosins and rosin esters. Examples of phenol-modified rosins include products of addition reactions of natural rosins or rosin derivatives and phenols, and phenol-modified rosins obtained by reactions of resol phenolic resins and natural rosins or rosin derivatives. Examples of rosin esters include esterified products obtained by reaction of the rosin-based resins with polyhydric alcohols. Rosin-phenolic resins can be esterified as well.

Examples of terpene-based resins include terpene resins (α-pinene resins, β-pinene resins, limonene resins, and the like), terpene phenolic resins, aromatically-modified terpene resins, hydrogenated terpene resins, and the like.

Examples of petroleum resins include aliphatic (C5) petroleum resins, aromatic (C9) petroleum resins, aliphatic/aromatic copolymer-based (C5/C9) petroleum resins, hydrogenated products thereof (for example, alicyclic petroleum resins obtainable by hydrogenating aromatic petroleum resins) and various modified products thereof (for example, modified maleic anhydride).

Examples of phenolic resins include condensation products of formaldehyde and various phenols such as phenol, m-cresol, 3,5-xylenol, p-alkylphenol, resorcinol, and the like. Other examples of phenolic resins include resoles obtained by alkali-catalyzed addition reactions of the phenols and formaldehyde, and novolacs obtained by acid-catalyzed condensation reactions of the phenols and formaldehyde.

Examples of coumarone-indene resins include coumarone-indene resin, hydrogenated coumarone-indene resin, phenol-modified coumarone-indene resin, epoxy-modified coumarone-indene resin, and the like.

Examples of ketone resins include ketone resins obtained by condensation of ketones (for example, aliphatic ketones such as methyl ethyl ketone, methyl isobutyl ketone, acetophenone, and the like, alicyclic ketones such as cyclohexanone, methylcyclohexanone, and the like) with formaldehyde.

The softening temperature of the tackifier resin used is not particularly limited. For example, a tackifier resin having a softening point of about 60° C. or more and about 160° C. or less can be used. From the viewpoint of combining the ability of not leaving an adhesive residue and adhesiveness in a well-balanced manner, a tackifier resin having a softening point of about 60° C. or more and about 140° C. or less (more preferably, about 70° C. or more and about 130° C. or less) can be preferably used. For example, a petroleum resin or a terpene resin having a softening point within this range is preferably used. The softening point of the tackifier resin can be measured based on the softening point test method (ring and ball method) prescribed in JIS K 2207.

The amount of the tackifier resin is not particularly limited and can be suitably determined according to the application. Based on non-volatiles, the amount of the tackifier resin with respect to 100 parts by weight of the polymer component can be, for example, about 20 parts by weight or more, and it is usually appropriate to set this amount to about 30 parts by weight or more (for example, about 40 parts by weight or more). From the viewpoints of the ability of not leaving an adhesive residue and low-temperature characteristic, it is usually appropriate to set the amount of the tackifier resin to about 200 parts by weight or less with respect to 100 parts by weight of the polymer component, and this amount is preferably about 150 parts by weight or less, and more preferably about 100 parts by weight or less (for example, 80 parts by weight or less).

(Reactive Phenolic Resin)

The PSA composition used for forming the PSA layer can include a reactive phenolic resin. This effectively improves the holding power. Further, the masking tape having a PSA layer formed from a PSA composition including a reactive phenolic resin can be excellent in the ability of not leaving an adhesive residue when peeled from the article to be treated after shot peening treatment.

As the reactive phenolic resin, any phenolic resin having a functional group reactive to an unsaturated bond may be used, and examples thereof include phenolic resins having a plurality of methylol groups (resol type resin, etc.) and the like. It may be a modified product obtained by substituting these methylol groups with halogens. Examples of preferred reactive phenolic resins include alkylphenol resins (for example, methylol group-containing alkylphenol resins) obtained by reacting a phenol having an alkyl group or an aryl group with an aldehyde such as formaldehyde. The phenol may be, for example, p-alkylphenol, p-allylphenol, p-terpene phenol, or the like. The reactive phenolic resins may be used singly or in combination of two or more thereof. The reactive phenolic resin may correspond to the tackifier resin described above.

The amount of the reactive phenolic resin may be, for example, about 5 parts by weight or more and about 30 parts by weight or less with respect to 100 parts by weight of the rubber type polymer, and is usually about 10 parts by weight or more and about 25 parts by weight or less. With such an amount of the reactive phenolic resin, the holding power and the ability of not leaving an adhesive residue tend to be advantageously improved by avoiding a significant decrease in adhesiveness due to excessive crosslinking and blooming to the PSA surface.

(Organometallic Compound)

The reactive phenolic resin may be used together with an organometallic compound. By using the reactive phenolic resin in combination with an organometallic compound, the crosslinking reaction involving the reactive phenolic resin is promoted, and the effect of the use of the reactive phenolic resin can be exhibited more efficiently.

Non-limiting examples of the organometallic compound include metal alcoholates and chelating metal alcoholates. Specific examples of the organometallic compound include metal alcoholates such as aluminum isopropylate, aluminum-s-butyrate, aluminum ethylate, titanium tetraisopropylate, titanium tetra-n-butyrate, titanium tetra-2-ethylhexylate, antimony butyrate, zirconium secondary butyrate, zirconium diethoxy-tert-butyrate, and the like; chelating metal alcoholates such as aluminum trisacetylacetate, aluminum trisethylacetoacetate, ethylacetoacetate aluminum diisopropylate, triethanolamine titanium diisopropylate, ammonium salt of titanium lactate; and also tetraoctylene glycol titanate, polyalkyl titanate, polytitaniumacylate (for example, polymerized titanium tetrabutylate and polymerized titanium oleate), and the like. Organometallic compounds in which the metal is aluminum, titanium or zirconium are preferred.

The amount of the organometallic compound is not particularly limited. It is usually appropriate to set the amount of the organometallic compound in relation to 100 parts by weight of the rubber-based polymer to about 0.2 parts by weight or more and about 10 parts by weight or less, and preferably about 0.5 parts by weight or more and about 7 parts by weight or less (for example, about 1 part by weight or more and about 5 parts by weight or less). With this amount, the holding power and the ability of not leaving an adhesive residue tend to be advantageously improved by avoiding a significant decrease in adhesiveness due to excessive crosslinking and blooming to the PSA surface.

(Gel Fraction)

The gel fraction of the PSA composition is not particularly limited. In one embodiment, the gel fraction is preferably in the range of about 10% or more and about 70% or less, and more preferably about 20% or more and about 65% or less. With the PSA composition having a gel fraction within the above range, a PSA layer excellent in the ability of not leaving an adhesive residue tends to be formed while excessive decrease in adhesiveness is being suppressed. This range of the gel fraction can be particularly preferably applied to, for example, a PSA composition including an organometallic compound (which can be a PSA composition including an organometallic compound and a reactive phenolic resin in combination).

The gel fraction is measured by the following method. Thus, a PSA composition is dried for 3 min at 130° C. to form a PSA layer. A PSA sample is taken from this PSA layer and the gel fraction is measured. Specifically, about 0.1 g of a PSA sample is wrapped in a purse-like shape with a porous polytetrafluoroethylene film (weight $Wg_2$) having an average pore size of 0.2 μm, and the mouth is tied with a kite string (weight $Wg_3$). As the porous polytetrafluoroethylene film, "NITOFLON (registered trademark) NTF1122", trade name (Nitto Denko Corporation, average pore diameter: 0.2 μm, porosity: 75%, thickness: 85 μm) or an equivalent thereof is used. The packet is immersed in 200 g of toluene and kept at room temperature (typically 23° C.) for 168 h (7 days) to elute only the sol component in the PSA to the outside of the film. Next, the packet is taken out, toluene adhering to the outer surface is wiped off, the packet is dried for 2 h at 130° C., and the weight ($Wg_4$) of the packet is measured. The gel fraction can be calculated by substituting each value into the following formula.

$$Gel\ fraction\ (\%) = [(Wg_4 - Wg_2 - Wg_3)/Wg_1] \times 100$$

In addition, the PSA composition may include, as necessary, known additives that can be used for PSAs (in particular, PSAs for masking tapes), such as a viscosity modifier (such as a thickener or the like), a leveling agent, a plasticizer, a softener, a filler, a colorant such as a pigment or a dye, a light stabilizer, an antiaging agent, an antioxidant, an antistatic agent, a foaming agent, a defoaming agent, a surfactant, a preservative, a crosslinking agent, and the like.

The PSA layer can be formed by using, as appropriate, various conventionally known methods. For example, a method (direct method) of forming a PSA layer by directly applying (typically, coating) a PSA composition to a substrate (for example, a PVC film) such as described above and drying. In addition, a method (transfer method) of forming a PSA layer on the surface by applying a PSA composition to a releasable surface (release surface) and drying, and then transferring the PSA layer to the substrate may be used. These methods may be used in combination. As the release surface, it is possible to use the surface of a release liner, the rear surface of the substrate subjected to release treatment, or the like.

Coating of the PSA composition can be carried out using a known or conventional coater such as a gravure roll coater, a reverse roll coater, a kiss roll coater, a dip roll coater, a bar coater, a knife coater, a spray coater, or the like. The PSA layer is typically formed continuously, but it may be formed in a regular or random pattern such as a dotted pattern, a striped pattern or the like depending on the purpose and the application.

The thickness of the PSA layer constituting the masking tape disclosed herein is not particularly limited. The thickness of the PSA layer can be, for example, about 80 μm or less, and it is usually appropriate to set the thickness to about 50 μm or less. In the masking tape according to one embodiment, the thickness of the substrate may preferably be less than about 50 μm, more preferably about 40 μm or less, and even more preferably about 35 μm or less. From the viewpoint of improving the ability of not leaving an adhesive residue, it can be advantageous not to make the PSA layer too thick. From such a viewpoint, the masking tape disclosed herein can be preferably implemented in a mode in which the PSA layer has a thickness of less than 30 μm. The PSA layer may have a thickness of about 28 μm or less, about 25 μm or less, or about 23 μm or less. The lower limit of the thickness of the PSA layer is not particularly limited. From the viewpoint of easily achieving the adhesiveness capable of maintaining the adequate affixed state against impacts of the shot peening treatment and adhesion state, it is usually appropriate to set the thickness of the PSA layer to about 7 μm or more, preferably about 10 μm or more, and more preferably about 15 μm or more (for example, about 17 μm or more). The masking tape disclosed herein can be preferably implemented, for example, in a mode in which the PSA layer has a thickness of about 10 μm or more and less than 50 μm (more preferably about 15 μm or more and about 40 μm or less).

<Masking Tape>

The total thickness of the masking tape (which means the total thickness of the substrate and the PSA layer) disclosed herein is not particularly limited. In one preferred embodiment, the masking tape may have the total thickness of about 125 μm or more (more preferably, about 165 μm or more, for example about 190 μm or more). As the total thickness increases, the breaking strength of the masking tape tends to increase. In addition, increasing the total thickness of the masking tape can also be advantageous from the viewpoint of improving impact absorption property. Therefore, due to an increase in the total thickness of the masking tape, durability against shot peening treatment and protective property of the article to be treated tend to improve. The masking tape disclosed herein can be preferably implemented, for example, in a mode in which the total thickness is about 200 μm or more (more preferably about 225 μm or more). The upper limit of the total thickness of the masking tape is not particularly limited, but from the viewpoints of handleability and ability to follow the surface shape of the adherend, it is usually appropriate to set the total thickness to about 1 mm or less, and the total thickness is preferably about 500 μm or less and may be about 400 μm or less (for example, preferably about 500 μm or less, more preferably about 450 μm or less, and still more preferably about 400 μm or less). The substrate may have a thickness of about 350 μm or less and may be about 300 μm or less. The masking tape disclosed herein can be preferably implemented in a mode in which the total thickness is, for example, about 150 μm or more and about 400 μm or less (more preferably about 170 μm or more and about 350 μm or less).

In one embodiment of the masking tape disclosed herein, the substrate may have a thickness $T_B$ which is, for example, about 3.0 times or more, and usually preferably about 4.0 times or more the thickness of the PSA layer $T_A$. In a preferred embodiment, the substrate may have the thickness $T_B$ greater than about 5.0 the thickness of the PSA layer $T_A$, and more preferably greater than about 5.5 times the thickness of the PSA layer $T_A$. With the masking tape having such a configuration, there is a tendency that durability against shot peening treatment, protection of the article to be treated, and ability of not leaving an adhesive residue on the treated article are achieved at a high level at the same time. The ratio of the thickness $T_B$ of the substrate to the thickness of the PSA layer $T_A$ (that is, $T_B/T_A$) can be, for example, about 6 or more, preferably about 6.5 or more, more preferably about 7.5 or more, even more preferably about 8.5 or more, and particularly preferably about 10 or more. The upper limit of $T_B/T_A$ is not particularly restricted, but from the viewpoint of avoiding deterioration of handleability due to excessive increase in the total thickness of the masking tape, it is usually appropriate to set the upper limit to about 25 or less. The upper ratio is preferably about 20 or less, more preferably about 17 or less (for example, about 15 or less), and may be about 13 or less.

In the art disclosed herein, the width of the masking tape is not particularly limited and can be appropriately set according to the purpose and application. From the viewpoint of preventing the occurrence of wrinkles and improving handleability, it is usually appropriate to set the width of the masking tape to about 500 mm or less, preferably about 400 mm or less, and more preferably about 300 mm or less. From the viewpoint of obtaining a higher effect, the width of the masking tape may be about 200 mm or less, for example, about 150 mm or less. The lower limit of the width of the masking tape is not particularly limited, and can be, for example, about 5 mm or more. From the viewpoint of efficiently covering a desired mask area, it is usually appropriate to set the width of the masking tape to about 10 mm or more, preferably about 20 mm or more, and more preferably about 30 mm or more. In one embodiment, the width of the masking tape may be about 50 mm or more.

(Adhesiveness)

The masking tape disclosed herein has an adhesiveness to duralumin of preferably about 0.5 N/10 mm or more, and more preferably about 0.8 N/10 mm or more, but these ranges are not particularly limiting. As the adhesiveness to duralumin increases, the adhesion to the article to be treated (typically, the metal surface) tends to improve. The upper limit of the adhesiveness to duralumin is not particularly limited, but from the viewpoints of peeling workability and the ability of not leaving an adhesive residue, it is usually appropriate to set the adhesiveness to duralumin to about 5.0 N/10 mm or less, preferably about 3.5 N/10 mm or less, and more preferably about 2.5 N/10 mm or less (for example, about 2.0 N/10 mm or less).

Here, the adhesiveness to duralumin refers to a 180-degree peel strength measured according to JIS Z 0237:2009 using a flat plate made of duralumin A2024 as an adherend. Specifically, the adhesiveness can be measured by press-bonding a test piece having a width of 10 mm and a length of 100 mm against the adherend with a 2-kg roller rolling back and forth once in a standard environment of 23° C. and 50% RH, and peeling off from the surface of the duralumin plate at a pulling rate of 300 mm/min in the 180-degree direction in 30 min after the press-bonding. The same measurement method is also used in the examples described hereinbelow.

(Heating Test)

It is preferable that the masking tape disclosed herein does not generate adhesive residue in a heating test conducted as follows, although this condition is not limiting. Thus, a rectangular test piece having a width of 15 mm and a length of 100 mm is press-bonded to an aluminum plate with a 2-kg roller rolling back and forth once in a standard environment of 23° C. and 50% RH and then placed in an oven at 150° C. within 30 min after the press-bonding. After holding in the oven for 1 h, the test piece is taken out to the standard environment and allowed to cool for 1 h. Thereafter, the test piece is peeled off manually from the aluminum plate. This peeling is carried out at an angle of about 180° with respect to the surface of the aluminum plate at a pulling rate of about 0.3 m/min. The surface of the aluminum plate after peeling off the test piece is visually observed to check the presence or absence of adhesive residue. The same test method is also used in the examples described hereinbelow. A masking tape that does not generate adhesive residue in the heating test is preferable because such a masking tape tends to exhibit satisfactory ability of not leaving an adhesive residue when peeled off from the article to be treated after shot peening treatment.

<Applications>

The masking tape disclosed herein may exhibit satisfactory durability against shot peening treatment. Also, the masking tape excels in performance of protecting the area (mask area) where the masking tape is affixed from the influence of the shot peening treatment. Further, the masking tape exhibits satisfactory ability of not leaving an adhesive residue on the article to be treated even after the shot peening treatment. Because of such features, the masking tape can be widely used for various types of shot peening treatment regardless of the type of the shot material, size and shape of the shot material, treatment conditions, and the like. Non-limiting examples of usable shot materials (also referred to as media or shot particles) include metals (steel, stainless steel, copper, zinc, aluminum, alloys thereof, and the like), ceramics (alumina, silicon carbide, and the like), glass, and resins (polyamide resin, melamine resin, urea resin, polyester resin, and the like). The shot material to be used can be, for example, in a form referred to as shots, grits, wires, and the like. The masking tape disclosed herein can be preferably used in shot peening using metal balls (for example, steel balls) as a shot material. The shot peening method may be selected suitably and may be a method of either of pneumatic type or of impeller type.

The material or shape of the object (adherend) to which the masking tape disclosed herein is to be affixed, that is, the article to be treated by shot peening treatment, is not particularly limited. The masking tape can be used in shot peening treatment of an article having a surface composed of various metallic materials, ceramic materials, glass materials, resin materials, composite materials thereof, and the like. The masking tape can be advantageously used for an article to be treated which has a surface composed of a metallic material, and can be preferably used for shot peening treatment of a metallic material composed of an iron-based metal or a light metal. As a preferable example of the object to be treated, a light metal member can be mentioned. The "light metal member", as referred to herein, means a metal member having a surface constituted by one light metal such as aluminum, magnesium, titanium, or the like or an alloy (light alloy) including such light metal as a main component. Further, the "aluminum member", as referred to herein, means a metal member having a surface made of aluminum or an aluminum alloy (alloy including aluminum as a main component). Examples of the aluminum alloy include a 2000 series alloy, a 3000 series alloy, a 4000 series alloy, a 5000 series alloy, a 6000 series alloy and a 7000 series alloy. A preferred application target of the masking sheet disclosed herein is an aluminum member having a surface composed of aluminum (typically 1000 series aluminum) or a 2000 series alloy (for example, duralumin A2024, duralumin A2017, and the like).

Since the masking tape disclosed herein can be suitably affixed also to a relatively wide mask area, the masking tape can be advantageously used in shot peening treatment of a metal member used as, for example, a structural member or an exterior part of a transportation equipment. Specific examples of the transportation equipment include automobiles (including passenger cars, trucks, buses, auto three-wheelers, tractors, snowmakers, bulldozers, amphibious vehicles, and the like), railroad cars (including trains such as bullet trains, diesel cars, linear motor cars, cable cars, monorails, trolley buses, and the like), aircrafts (including airplanes, helicopters, air cushion boats, and the like), vessels (including large ships, small vessels, water scooters, and the like), and the like. As one preferred example, the masking tape can be advantageously used for shot peening treatment of aluminum members (typically duralumin members) for structural members of aircrafts.

According to this specification, there is provided a method for manufacturing an article, comprising a step of subjecting an article to be treated in which any of the masking tapes disclosed herein is affixed to a masking-target portion to shot peening treatment.

The manufacturing method may further include a step of affixing the masking tape to the article to be treated. Since the masking tape disclosed herein has satisfactory durability against shot peening treatment and protective property with respect to the mask area, the masking tape can also be advantageously used in a mode in which the masking tape is not overlapped. Alternatively, the masking tape may be used in a mode in which the entire masking tape or part thereof is overlapped in accordance with the conditions of the shot peening treatment or the like.

The manufacturing method may further include a step of peeling the masking tape from the article to be treated after the shot peening process. Since the masking tape disclosed herein exhibits satisfactory ability of not leaving an adhesive residue, the peeling operation can be performed efficiently.

Further, since the masking tape disclosed herein exhibits excellent durability against shot peening treatment (for example, the masking tape is unlikely to generate scraps caused by rupture of the substrate), the masking tape is not limited to shot peening treatment and can be widely used for masking non-treatment-target portions of an article to be treated at the time of carrying out the treatment (including shot blasting, sand blasting, and the like) performed by causing a shot material to collide with the article to be treated, and for a method for manufacturing an article including such a treatment.

EXAMPLES

Several examples relating to the present invention will be described below, but the present invention is not intended to be limited to the specific examples. In the following description, "parts" and "%" are on a weight basis unless otherwise specified.

<Preparation of PSA Tape>

Example 1

A total of 20 parts of an elastomer (chlorinated polyethylene, trade name "ELASLEN 301A", manufactured by Showa Denko K.K.), 20 parts by weight of a trimellitic acid plasticizer (trimellitic acid tri-2-ethylhexylate, product name "W-705", manufactured by DIC Corporation), 30 parts of adipic acid polyester-based plasticizer (product name "W-4010", manufactured by DIC Corporation), 0.5 parts of zinc laurate (manufactured by Mitsuwa Chemicals Co., Ltd.), 0.5 parts of calcium stearate (manufactured by Kishida Chemical Co., Ltd.), 2 parts of hydrotalcite (trade name "ALCAMIZER", manufactured by Kyowa Chemical Industry Co., Ltd.), 2 parts of black pigment, and 1 part of an antiaging agent (trade name "Irganox 1010" manufactured by BASF SE) were mixed with 100 parts of polyvinyl chloride (trade name "TK-1300", degree of polymerization 1300, manufactured by Shin-Etsu Chemical Co., Ltd.), to prepare a PVC composition B1. A PVC film F1 having a thickness of 230 μm was produced from the PVC composition B1 at a molding temperature of 150° C. by using a calender molding machine.

A total of 50 parts of petroleum resin (alicyclic saturated hydrocarbon resin, trade name "Arkon P120", manufactured by Arakawa Chemical Industries, Ltd.), 15 parts of a reactive phenolic resin (alkylphenol formaldehyde resin, trade name "TACKIROL 201", manufactured by Taoka Chemical Co., Ltd.), 1 part of an antiaging agent (trade name "Irganox 1010", manufactured by BASF SE), 3 parts of an organometallic compound (aluminum alkyl acetoacetate diisopropylate, trade name "Alumichelate M", manufactured by Kawaken Fine Chemicals Co., Ltd.) were added to 100 parts of natural rubber, and the components were uniformly dissolved in a toluene solution to prepare a PSA composition C1.

The PSA composition C1 was coated on one side of the PVC film F1 serving as a substrate and dried by heating for 3 min at 150° C. to form a PSA layer having a thickness of 20 μm. In this way, a PSA tape A1 according to Example 1 was produced.

Example 2

A PSA composition C2 was prepared in the same manner as the PSA composition C1 except that 60 parts of a terpene resin (trade name "YS RESIN PX1150N", manufactured by Yasuhara Chemical Co., Ltd.) was used in place of 50 parts of petroleum resin, and 3 parts of aluminum isopropylate (product name "AIPD, PADM", manufactured by Kawaken Fine Chemicals Co., Ltd.) was used as an organometallic compound instead of 3 parts of aluminum alkyl acetoacetate diisopropylate.

A PSA tape A2 according to this example was produced in the same manner as the PSA tape A1 except that the PSA composition C2 was used instead of the PSA composition C1.

Example 3

A PVC composition B2 was prepared in the same manner as the PVC composition B1, except that the amount of elastomer and the amount of trimellitic acid type plasticizer to be mixed with 100 parts of polyvinyl chloride were each changed to 30 parts. A PVC film F2 was produced in the same manner as the PVC film F1 except that the PVC composition B2 was used in place of the PVC composition B1.

A PSA tape A3 according to this example was produced in the same manner as the PSA tape A2 except that the PVC film F2 was used as a substrate instead of the PVC film F1.

Example 4

A PVC film F3 having a thickness of 100 μm was produced from the PVC composition B1 at a molding temperature of 150° C. by using a calender molding machine.

A PSA tape A4 according to this example was produced in the same manner as the PSA tape A1 except that the PVC film F3 was used as a substrate instead of the PVC film F1.

Example 5

A total of 60 parts of a terpene resin (trade name "YS RESIN PX1150N", manufactured by Yasuhara Chemical Co., Ltd.), 5 parts of liquid rubber (trade name "Polybutene HV-300", manufactured by JX Nippon Oil & Energy Corporation), and 1 part of an antiaging agent (trade name "Irganox 1010", manufactured by BASF SE) were added to 100 parts of natural rubber and uniformly dissolved in a toluene solution to prepare a PSA composition C3.

A PSA tape A5 according to this example was produced in the same manner as the PSA tape A1 except that the PSA composition C3 was used instead of the PSA composition C1.

Example 6

A PSA tape A6 according to this example was produced in the same manner as the PSA tape A1 except that a polyester film F4 (product name "Lumirror S-10", thickness: 100 μm, manufactured by Toray Industries, Inc.) was used as the substrate instead of the PVC film F1.

Example 7

A PSA tape A7 according to this example was produced in the same manner as the PSA tape A3 except that the adhesive layer had a thickness of 5 μm.

<Measurement and Evaluation>

For the PSA tape according to each example, the room-temperature breaking strength, the impact absorption rate, and the adhesiveness to duralumin were measured by the above-mentioned methods, and the holding power test and the heating test were performed. The results are shown in Table 1. In the holding power test, when the test piece peeled off from the adherend and dropped within 1 h after the load was applied to the test piece, "Drop" was indicated in the column of holding power. Further, in the heating test, in the case where an adhesive residue was observed, it was evaluated that the adhesive residue was "Present" (poor ability of not leaving an adhesive residue) and such a case was represented by "P" in Table 1. In the case where an adhesive residue was not observed, it was evaluated that the adhesive residue was "Not present" (satisfactory ability of not leaving an adhesive residue) and such a case was represented by "G" in Table 1.

The following shot peening test was then conducted. That is, at room temperature (about 23° C.), the PSA tape according to each example was affixed to an aluminum flat plate as an article to be treated, and shot peening was carried out by a pneumatic apparatus by using steel balls having a diameter (average diameter) of 0.3 mm and a hardness of Hv 800 as a shot material. Thereafter, the PSA tape according to each example was peeled off manually from the article to be treated. This peeling was carried out at a pulling rate of about 0.3 m/min in a direction of approximately 180 degrees with respect to the surface of the aluminum flat plate. Each performance was evaluated according to the following criteria.

Durability: When a recess was observed on the surface of the article to be treated at the location where the PSA tape was affixed after peeling off the PSA tape, or when generation of scraps of the PSA tape was visually observed, the durability was evaluated as "None" (poor durability) and represented by "P" in Table 1. When these phenomena were not recognized, the durability was evaluated as "Durable" (satisfactory durability) and represented by "G" in Table 1.

Adhesive residue: In the case where a PSA substance remained on at least a part of the surface of the article to be treated after peeling off the PSA tape, it was evaluated that the adhesive residue was "Present" (poor ability of not leaving an adhesive residue) and such a case was represented by "P" in Table 1. In the case where the residue of the PSA substance was not observed, it was evaluated that the adhesive residue was "Not present" (satisfactory ability of not leaving an adhesive residue) and such a case was represented by "G" in Table 1.

Peeling: In the case where the PSA tape peeled off during shot peening and a recess was observed on the surface of the article to be treated at the peeled location, it was evaluated that peeling was "Present" (poor peeling resistance) and such a case was represented by "P" in Table 1. When this phenomenon was not recognized, it was evaluated that peeling was "Absent" (satisfactory peeling resistance) and such a case was represented by "G" in Table 1.

The results are shown in Table 1.

Each of the PSA tapes according to Examples 1 to 3 had appropriate elongation deformability to the extent that the affixing workability was good and the peeling workability was not impaired. The elongation at break of the PSA tape according to Example 1 measured by the method described above was 285%. In addition, when the low-temperature breaking strength of the PSA tapes according to Examples 1 to 3 was measured by the above-mentioned method, the results were in the range of 111 N/15 mm or more and 130 N/15 mm or less.

TABLE 1

|  |  | Example | | | | | | |
| --- | --- | --- | --- | --- | --- | --- | --- | --- |
|  |  | 1 | 2 | 3 | 4 | 5 | 6 | 7 |
| Substrate | Film | F1 | F1 | F2 | F3 | F1 | F4 | F2 |
|  | Thickness [μm] | 230 | 230 | 230 | 100 | 230 | 100 | 230 |
| PSA | Composition | C1 | C2 | C2 | C1 | C3 | C1 | C1 |
|  | Thickness [μm] | 20 | 20 | 20 | 20 | 20 | 20 | 5 |
|  | Room-temperature breaking strength [N/15 mm] | 83 | 83 | 77 | 52 | 83 | 330 | 77 |
|  | Impact absorption rate [%] | 50 | 50 | 45 | 28 | 50 | 15 | 50 |
|  | Adhesiveness [N/10 mm] | 1.2 | 1.6 | 1.6 | 2.4 | 3.9 | 1.0 | 0.2 |
|  | Holding power [mm] 40° C., 500 g, 1 h | 0.1 | 0.1 | 0.1 | 0.1 | Drop | 0.1 | Drop |
| Heating test | Ability not to leave adhesive residue | G | G | G | G | P | G | G |
| Shot peening test | Durability | G | G | G | P | G | P | G |
|  | Ability not to leave adhesive residue | G | G | G | G | P | G | G |
|  | Resistance to peeling | G | G | G | G | G | G | P |

As shown in Table 1, in the shot peening test, durability, ability of not leaving an adhesive residue, and peeling resistance could not be satisfied at the same time with the PSA tapes according to Examples 4 to 7. Meanwhile, the PSA tapes according to Examples 1 to 3 had durability, ability of not leaving an adhesive residue and peeling resistance at the same time, no recesses, scratches, modifications, and the like caused by shot peening treatment were observed on the surface after the tape peeling (the surface of the mask area), and satisfactory protective property was demonstrated. From the above, it was confirmed that the PSA tapes according to Examples 1 to 3 exhibit suitable performance as masking tapes for shot peening treatment. Further, the PSA tapes according to Examples 5 and 7 also had satisfactory protective property, but adhesive residues were observed in Example 5, and in Example 7, the protective property was impaired because the PSA tape peeled off. In the PSA tapes according to Examples 4 and 6, sufficient protective property was not obtained due to insufficient durability.

Although specific examples of the present invention have been described in detail above, they are merely examples and do not limit the scope of the claims. The techniques described in the claims include those in which the specific examples exemplified above are variously modified and changed.

REFERENCE SIGNS LIST 10, 20 Masking tape
11 Substrate
11A First surface
11B Second surface
21 PSA layer
21A Surface (PSA surface)
31 Release liner
100 Masking tape roll

The invention claimed is:

1. A masking tape for a shot peening process, comprising:
a substrate having a first surface and a second surface; and
a pressure-sensitive adhesive layer disposed on the first surface of the substrate, wherein
the substrate includes a polyvinyl chloride film comprising polyvinyl chloride, an elastomer, and a plasticizer, wherein an amount of the plasticizer of 15 parts by weight or more with respect to 100 parts by weight of the polyvinyl chloride,
the plasticizer includes a carboxylic acid ester-based plasticizer and a polyester-based plasticizer,
the ratio ($W_B/W_A$) of a weight ($W_B$) of the polyester-based plasticizer to a weight ($W_A$) of the carboxylic acid ester-based plasticizer contained in the polyvinyl chloride film is 0.2 or more and 5 or less,
a pressure-sensitive adhesive constituting the pressure-sensitive adhesive layer is a rubber-based pressure-sensitive adhesive,
the pressure-sensitive adhesive layer includes a reactive phenolic resin,
the pressure-sensitive adhesive layer is formed of a solvent-based pressure-sensitive adhesive composition,
the substrate has a thickness which is 6.0 times or more and 25 times or less of a thickness of the pressure-sensitive adhesive layer,
the masking tape has a breaking strength of 55 N/15 mm or more, exhibits an impact absorption rate of 20% or more in a falling ball impact test, and
has a displacement distance of 2 mm or less after 1 h from an initial position in a holding power test at 40° C. which is performed by applying a load of 500 g.

2. The masking tape according to claim 1, wherein the substrate has a thickness of 120 μm or more.

3. The masking tape according to claim 1, wherein the pressure-sensitive adhesive layer has a thickness of less than 50 μm.

4. A method for manufacturing an article, the method comprising a step of subjecting an article to be treated, in which the masking tape according to claim 1 is affixed to a masking-target portion, to shot peening treatment.

* * * * *